H. B. Chess,
Ornamental Screw Head.
N° 42,077.  Patented Mar. 29, 1864.
Fig: 1.
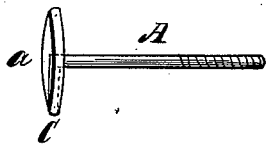
Fig: 2.
Fig: 3.
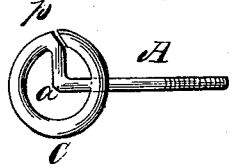
Witnesses:
Geo. W. Gregory
George H. Clarke
Inventor:
Harvey B Chess

UNITED STATES PATENT OFFICE.

HARVEY B. CHESS, OF PITTSBURG, PENNSYLVANIA.

IMPROVED SCREW-HEAD.

Specification forming part of Letters Patent No. 42,077, dated March 29, 1864.

*To all whom it may concern:*

Be it known that I, HARVEY B. CHESS, of Pittsburgh in the county of Allegheny and State of Pennsylvania, have invented a new and useful Improvement in the Heads of Screws, Lamp-Burner Regulators, and other Articles; and I do hereby declare that the following is a full, clear, and exact description of the same, reference being had to the accompanying drawings, forming a part of this specification, in which—

Figure 1 is a side view of a screw with my improved head. Fig. 2 is a front view of the head. Fig. 3 is a perspective view of the screw.

Similar letters of reference indicate corresponding parts in the several figures.

The object of my invention is to obtain a cheaper and better substitute for the disk or milled heads, commonly provided on screws, lamp-burner regulators, and other articles, which require to be turned or manipulated with the finger and thumb; and to this end it consists in forming the heads of such articles of the same piece of wire as the screw spindle or stock by bending the wire at a right angle and into the form of a ring concentric and perpendicular, or nearly so, with the screw spindle or stock. This head may have its edge milled or left plain.

To enable others skilled in the art to make and use my invention, I will proceed to describe it with reference to the drawings.

A is the wire of which the screw is formed, made long enough to produce the head also.

The head is formed by making a short bend in the wire at a right angle, at a point, $a$, at a distance from one end equal to the unbent circumference and radius of the head, then making another short bend at a point, $p$, distant from the first point, equal to the radius of the head, and coiling up the portion which is to form the head $c$ in a circular form in a plane perpendicular to the screw to make its end meet the bend $p$, where the end may either be soldered or not, as may be desired. This head may have its outer edge milled in a lathe or left plain.

Among the various articles which may be made with this kind of head may be mentioned the hooks of the breast-straps of soldiers' knapsacks.

I do not claim, broadly, the forming of the heads of screws or other articles of the same piece of wire with the screw shank or stock, as I am aware that heads have been so formed by bending or coiling the wire in a plane parallel with the screw shank or stock; but

What I claim as my invention, and desire to secure by Letters Patent, is—

The head $c$, formed by bending the wire in the manner herein described in the form of a ring perpendicular to and concentric, or nearly so, with the screw shank or stock.

HARVEY B. CHESS.

Witnesses:
 CH. McCLURE HAYS,
 ED. F. WHITMORE.